Patented Jan. 6, 1925.

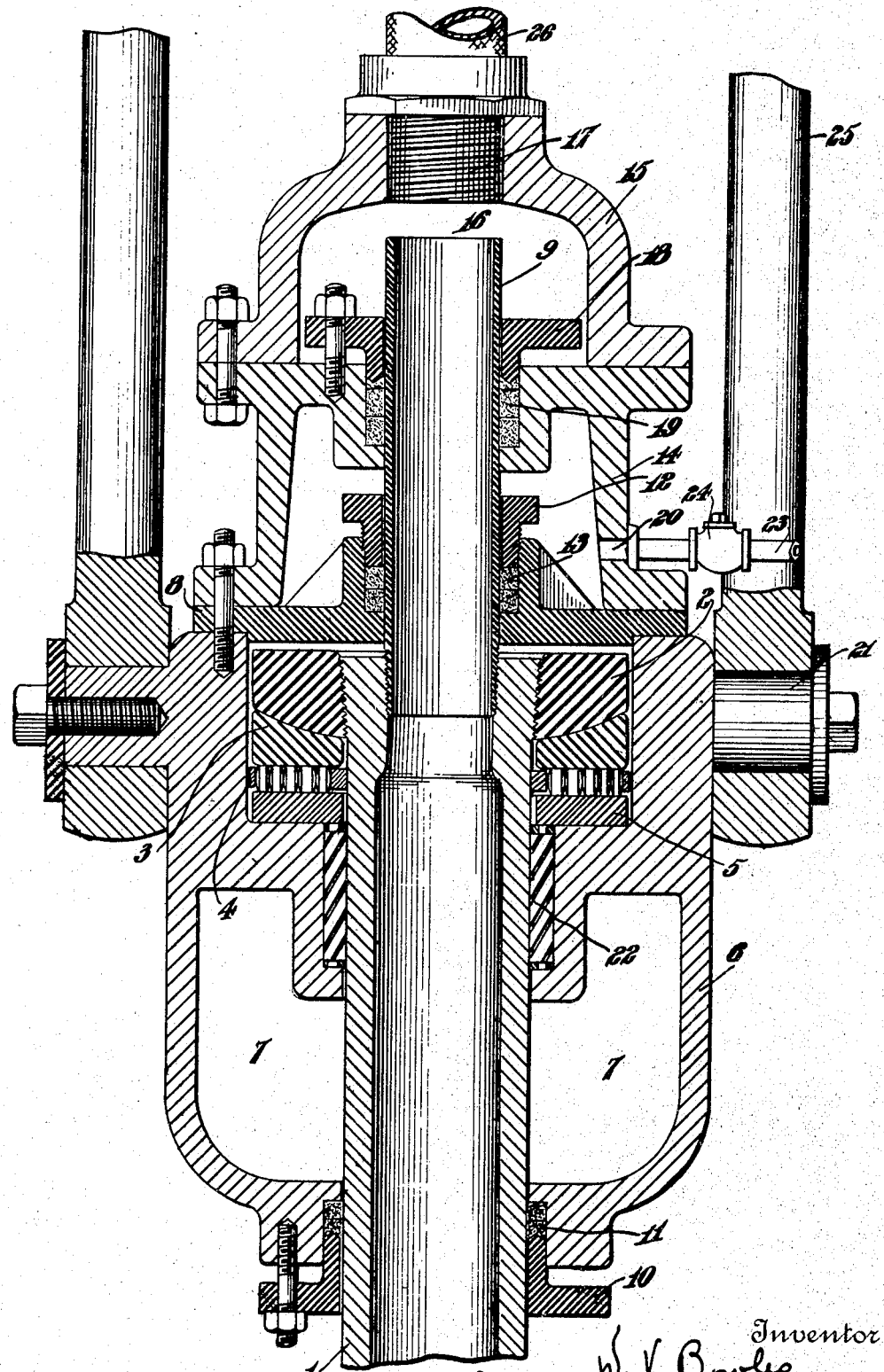

1,522,226

UNITED STATES PATENT OFFICE.

WILLIAM VICTOR BOWLES, OF HOUSTON, TEXAS, ASSIGNOR TO THE TEXAS COMPANY, OF NEW YORK, N. Y., A CORPORATION OF TEXAS.

SWIVEL

Application filed November 22, 1920. Serial No. 425,824.

*To all whom it may concern:*

Be it known that I, WILLIAM V. BOWLES, a citizen of the United States, residing in Houston, in the county of Harris and State of Texas, have invented certain new and useful Improvements in Swivels, of which the following is a specification, reference being had to the accompanying drawing, forming a part thereof.

This invention relates to hydraulic well drilling appliances and has particular reference to the swivels by which the drilling mechanism is supported and rotated.

Considerable difficulty has hitherto been experienced in protecting the swivel from mud and water due to the fact that the packing about the rotatable parts frequently leaks on account of the high pressures to which it is subjected. It is an object of this invention to reduce the number of packing glands required for a swivel and to provide a suitable packing arrangement whereby the liability of leakage is greatly reduced.

Further objects of the invention are to provide a protective housing for the swivel bearings wherein they may be encased in a suitable protective fluid and to provide a form of construction for the bearing parts that will withstand the great strain to which the swivel bearings are subjected when drilling deep wells.

In accordance with my invention the usual hose stem extending through the swivel and equipped with a plurality of packing glands, is dispensed with, and the hose stem is arranged to communicate with a suitable water reservoir and a pipe is provided for conducting the water from the reservoir to the swivel stem.

I have illustrated a preferred form of the invention in the accompanying drawing which shows a sectional elevation of an apparatus arranged in accordance with the invention and constituting an embodiment thereof.

The pipe or main swivel stem 1 is adapted to be connected to the drill in such manner as will readily be understood by those skilled in the art. The upper end of the swivel stem is threaded externally in order that it may be attached to the upper bearing plate 2. I prefer to employ coarse tapered threads in the making of this connection so that when repairs are necessary the bearing plate can be more easily removed than in case the connection was made by means of fine, straight threads. The bearing plate 2 rests upon the bearing plate 3, the upper plate being preferably convex in shape in order that it may fit into the concave surface of the lower plate. Underneath the plate 3 are the bearings 4 resting on the race plate 5.

In drilling wells there are at times powerful lateral strains to which the swivel bearings are subjected and the form of construction illustrated is well adapted to take care of these great strains. On account of the freedom of movement of the bearing plate 3 and owing to the convex surface of the upper bearing and the concave surface of the lower one the weight carried by the swivel stem 1 will be thrown evenly upon the bearings and since there is no tendency to exert a greater pressure on one side than upon another the bearings 4 will be worn evenly.

The bearings are enclosed in a casing or trunnion body 6 having a chamber 7 which is adapted to contain oil, the casing having a top plate 8 which is bolted onto it. The bearings are thus maintained in a bath of oil so that they may be properly lubricated and at the same time are protected from dirt, water and mud. A pipe or other oil feeding arrangement may be provided, if desired for feeding oil to the chamber 7. The pencil bearings 22 are inserted in order to take care of thrust movements.

The swivel stem 1 is internally threaded at the top in order that it may be attached to the pipe 9, the swivel stem and pipe being rigidly secured to each other so that they rotate during the operation of the drill. A suitable packing which may consist of the gland 10 and packing material 11 is provided about the swivel stem 1 at the base of the oil chamber and similarly packing is provided at the top of the chamber consisting of the gland 12 and packing material 13. It is sufficient to attach the lower gland by means of bolts. The upper gland, however, may best be threaded and arranged to screw into a supporting member at the top of the top plate 8.

A housing 14 is fastened onto the top plate and another casing 15 is secured on top of the housing 14. As shown in the drawing the several housings are secured by means of bolts. Obviously other forms of construction may be used. For example, the different housings may be attached to each other by threads. However, I prefer to make the attachments by means of bolts since the several parts of the apparatus may be more readily taken apart when repairs are necessary.

The casing 15 incloses a chamber 16 into which the water used in drilling the well is introduced. An opening 17 is provided for attachment of a hose stem 26, the opening preferably having threads in order that the hose stem may be screwed into the casing 15. The rotating member 9 is packed by means of the gland 18 and packing material 19, the pressure of the water in the chamber tending to force the gland tightly into position. This packing is the only one in the entire apparatus which is required to stand high pressures and it is therefore made up of such materials as will withstand the pressures commonly employed in drilling oil wells.

The housing 14 may be provided with an opening 20 so that in case the packing 19 should leak the water flowing into the housing will flow through the opening and will at once indicate to the operator that the high pressure packing needs attention. If desired a pipe 23 having a check valve 24 may be connected to the opening 20 and thus the entrance of any foreign substance within the housing 14 may be prevented while any water collecting therein may be discharged.

The swivel is supported by means of the trunnion blocks or studs 21 upon which a swivel bail 25 is hung, as will be readily understood by those skilled in the art.

The pipe 9 preferably extends above the bottom of the chamber 16 in order that sediment in the water may be allowed to collect in the space below the top of the pipe. If desired this space may be filled with a heavy grease in order to protect the bearing from grit and sediment.

In operation the swivel stem 1 is rotated upon its bearings and water is pumped in through the hose stem 26 into the chamber 16 from where it flows through the pipe 9 into the swivel stem 1.

Apparatus of preferred form and construction has been illustrated and described for the purpose of showing a way in which this invention may be used, but the inventive thought upon which the application is based, is broader than this illustrative embodiment thereof, and I therefore intend no limitations other than those imposed by the appended claims.

What I claim is:—

1. In a swivel, a hollow trunnion body, a swivel stem extending through said trunnion body, means for rotatably supporting the swivel stem within said trunnion body, a chambered member within which the upper end of the swivel stem terminates, means for introducing water into the chamber and a stuffing box for said stem positioned within said chamber and adapted to be forced into position by the pressure of the water within the chamber.

2. In a swivel, a hollow trunnion body, a swivel stem extending through said trunnion body, means for rotatably supporting the swivel stem within said trunnion body, a plate adapted to form a closure for said hollow trunnion body and provided with an aperture through which the swivel stem may pass, a stuffing box for said stem mounted upon said plate, a stationary chambered member within which the upper end of the swivel stem terminates, means for introducing water into said chamber and a stuffing box for said stem positioned within said chamber and adapted to be forced into position by the pressure of the water within the chamber.

3. In a swivel, a hollow trunnion body, a plate mounted thereon arranged to form a closure for said hollow trunnion body, a housing positioned above said trunnion body, a chambered member supported by said housing, a swivel stem passing through said hollow trunnion body and housing and terminating slightly above the bottom of said chamber, means for rotatably supporting said swivel stem within said trunnion body, a pair of stuffing boxes for said swivel stem one of which is adapted to prevent the passage of fluid from the hollow trunnion body and the other of which is adapted to prevent the passage of fluid from said chamber.

4. In a swivel, a hollow trunnion body, a plate mounted thereon arranged to form a closure for said hollow trunnion body, a housing mounted above said hollow trunnion body, a chambered member supported by said housing, a swivel stem passing through said hollow trunnion body and housing and terminating slightly above the bottom of said chamber, a bearing plate attached to said swivel stem, bearing members cooperating therewith adapted to rotatably support said swivel stem within the hollow trunnion body, a stuffing box for the stem mounted upon the trunnion body closure plate, and a stuffing box for said stem positioned within said chamber.

5. In a swivel, a hollow trunnion body, a swivel stem rotatably supported on said trunnion body, a plurality of pencil bearings surrounding said stem to compensate for thrust movements thereof, a pipe attached to the upper end of said stem, a chambered member mounted above the trunnion body within which said pipe terminates and stuffing boxes for said pipe.

6. In a swivel, a stationary hollow trunnion body, a rotatable swivel stem extending through said trunnion body, means carried by said trunnion body and provided with a chamber in which the upper end of the swivel stem terminates, means for delivering water under pressure into said chamber, and a stuffing box surrounding said swivel stem and disposed within said chamber in such manner that the water pressure tends to maintain the stuffing box tight.

7. In a swivel, a stationary hollow trunnion body, a chambered member carried by said trunnion body, means for delivering water into said chamber, a swivel stem rotatably mounted in said trunnion body and extending into said water chamber a short distance to provide a trap for sediment, and a stuffing box surrounding said swivel stem and disposed within said chamber.

8. In a swivel, a stationary hollow trunnion body provided with three separate enclosed chambers disposed the one above the other, a rotatable swivel stem extending through the two lower chambers and terminating within the upper chamber, bearings for said swivel stem disposed within the lowest chamber, said chamber containing an oil bath, stuffing boxes surrounding said swivel stem and disposed respectively at the lower end of said lowest chamber and between the three chambers, means for supplying water to the uppermost chamber, and an outlet in the intermediate chamber to draw off any water that may leak through the uppermost stuffing box whereby the entrance of water into the oil bath is prevented.

9. In a swivel, a stationary hollow trunnion body having a bearing chamber and a water chamber disposed above it, a rotatable swivel stem extending through said trunnion body and terminating in said water chamber, a self-centering thrust bearing for said swivel stem disposed within said bearing chamber and comprising cooperating members adapted for relative lateral shifting movements for equalizing and distributing the load thereon, a stuffing box surrounding said swivel stem and disposed in said water chamber and means for supplying water under pressure to said water chamber.

10. In a swivel, a stationary hollow trunnion body having a bearing chamber, a rotatable swivel stem projecting through said trunnion body, and a self-centering thrust bearing for said swivel stem disposed within said bearing chamber and comprising cooperating members adapted for relative lateral shifting movements for equalizing and distributing the load thereon.

11. In a swivel, a stationary hollow trunnion body having a bearing chamber, a rotatable swivel stem projecting through said trunnion body chamber, and a self-centering thrust bearing for said swivel stem adapted to hold said stem in fixed axial alinement and comprising relatively shiftable cooperating members for equalizing and distributing the load thereon.

12. In a swivel, a stationary hollow trunnion body having a bearing chamber, a rotatable swivel stem projecting through said trunnion body chamber, and a self-centering thrust bearing for said swivel stem adapted to hold said stem in fixed axial alinement and comprising a bearing plate fixed to said swivel stem and provided with a lower convex surface, a laterally shiftable bearing plate having an upper concave surface upon which the upper bearing plate rests, a race-plate disposed beneath said lower bearing plate, and a plurality of antifriction bearings disposed between said lower bearing plate and said race-plate.

13. In a swivel, a hollow trunnion body having a bearing chamber, a rotatable swivel stem extending through said trunion body, self-centering thrust bearings for said swivel disposed within said bearing chamber, and a plurality of independent pencil bearings disposed around said swivel stem and beneath said self-centering bearings for compensating for thrust movements of said stem.

In witness whereof I have hereunto set my hand this 6th day of Nov., 1920.

WILLIAM VICTOR BOWLES.